(12) United States Patent
Bannon

(10) Patent No.: US 6,916,044 B2
(45) Date of Patent: Jul. 12, 2005

(54) STEERING COLUMN/AIRBAG TUNABLE IMPACT ABSORPTION SYSTEM

(75) Inventor: Sean A. Bannon, Bloomfield Hills, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 70 days.

(21) Appl. No.: 10/615,575

(22) Filed: Jul. 8, 2003

(65) Prior Publication Data
US 2005/0006890 A1 Jan. 13, 2005

(51) Int. Cl.⁷ .................................. B62D 1/19
(52) U.S. Cl. ................... 280/777; 280/779; 74/493; 74/495
(58) Field of Search ................ 280/775, 777, 280/779; 74/493, 495

(56) References Cited

U.S. PATENT DOCUMENTS 5,507,521 A * 4/1996 Steffens, Jr. ............. 280/775
6,116,648 A * 9/2000 Holly et al. ............... 280/777
6,631,924 B2 * 10/2003 Nomura et al. ........... 280/777
6,641,167 B2 * 11/2003 Riefe et al. ............... 280/777
6,749,222 B2 * 6/2004 Manwaring et al. ...... 280/777

* cited by examiner

Primary Examiner—Paul N. Dickson
Assistant Examiner—Tuan C. To
(74) Attorney, Agent, or Firm—Ralph E. Smith

(57) ABSTRACT

An impact absorption system for a motor vehicle has a steering column with a first sleeve and a second sleeve. The first sleeve is sized to receive a portion of the second sleeve. The sleeves extend between a first mounting bracket and a second mounting bracket. A piston cylinder assembly is mounted between the first and second mounting brackets. A plurality of igniters is in communication with the piston cylinder assembly. The plurality of igniters, when activated, are capable of releasing a pressurized fluid to pressurize the piston cylinder assembly. A plurality of sensors are mounted within the motor vehicle for signaling the vehicle and driver conditions. A controller is in communication with the plurality of sensors and the plurality of igniters. The controller activates at least one of the plurality of igniters based on the signals from the plurality of sensors during an impact event.

8 Claims, 4 Drawing Sheets

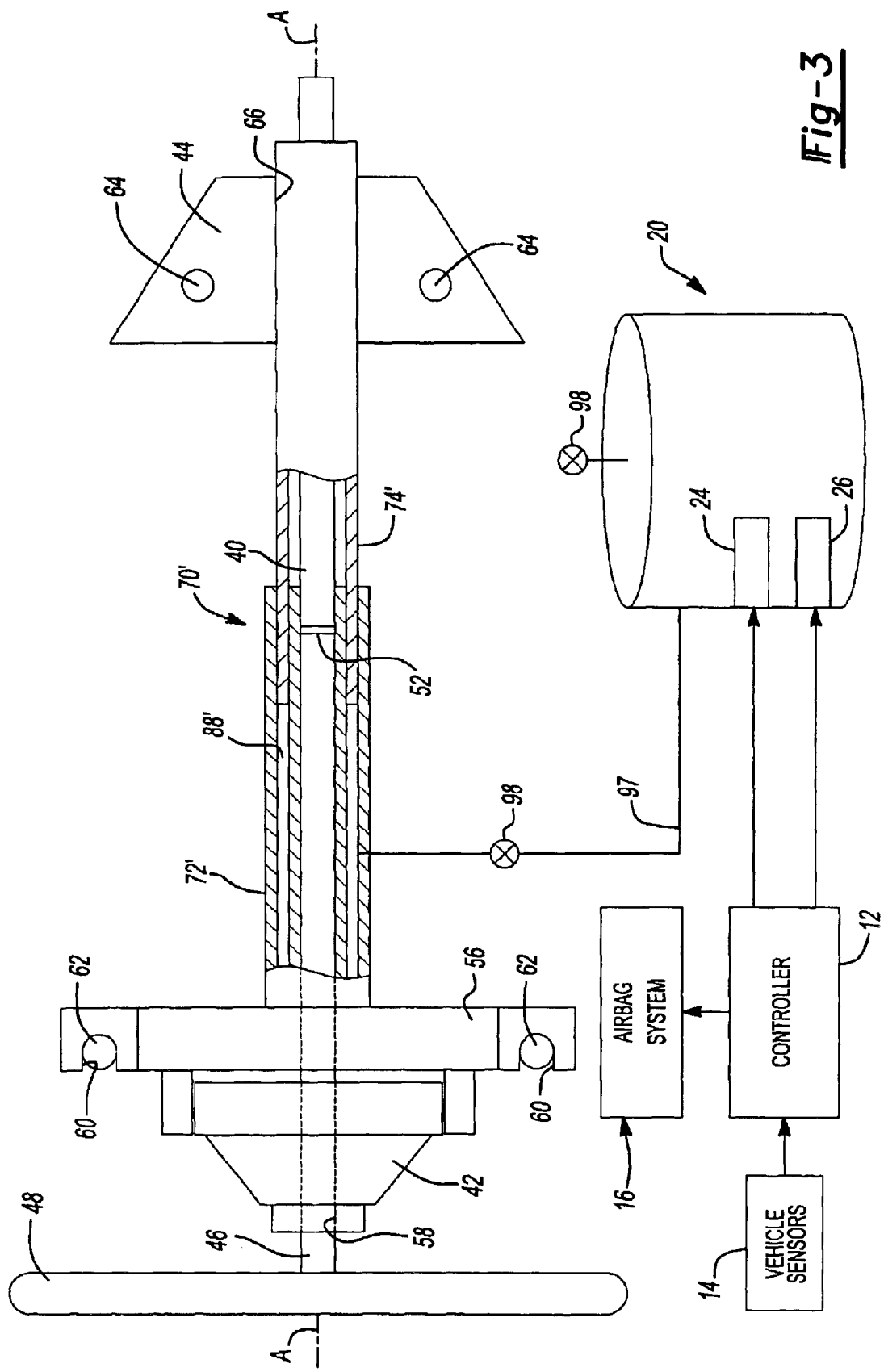

STEERING COLUMN/AIRBAG TUNABLE IMPACT ABSORPTION SYSTEM

FIELD OF THE INVENTION

The present invention relates to a tunable energy absorption system and more particularly to a steering column and airbag tunable energy absorption system for a motor vehicle.

BACKGROUND OF THE INVENTION

Throughout the automotive industry, safety systems have become standard equipment on all automobiles. Two typical safety systems include the airbag deployment system and the collapsible steering column system. Both systems act to absorb the energy of a collision to thereby protect the occupants of the vehicle. The airbag system accomplishes this by deploying an airbag which then collapses as the driver or other occupant strikes the airbag. The airbag absorbs impact energy as it collapses and deflates. The collapsible steering column absorbs energy by collapsing, or "stroking", such that it absorbs the energy of the impact as it strokes.

Typically, these safety systems have a set level of energy that they are capable of absorbing. Specifically, the airbag deploys with a predetermined pressure and force under all impact events, and the steering column strokes under a given impact force and absorbs a set amount of energy during the stroke. These devices as an integrated system are not tunable to specific vehicle and driver conditions in a "real time" impact event. For example, a larger, heavier occupant requires a different level of energy absorption in a given collision than a smaller, lighter occupant. Traditional airbag and steering column systems are not tunable in real time.

SUMMARY OF THE INVENTION

An impact absorption system for a motor vehicle is provided having a first sleeve and a second sleeve. The first sleeve is sized to receive a portion of the second sleeve. The sleeves extend between a first mounting bracket and a second mounting bracket. A piston cylinder assembly is mounted between the first and second mounting brackets. The impact absorption system also has a plurality of igniters in communication with the piston cylinder assembly. The plurality of igniters, when activated, are capable of releasing a pressurized fluid to pressurize the piston cylinder assembly. A plurality of sensors are mounted within the motor vehicle for signaling the vehicle and driver conditions. A controller is in communication with the plurality of sensors and the plurality of igniters. The controller activates at least one of the plurality of igniters based on the signals from the plurality of sensors during an impact event.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a sectional view of an alternate embodiment of the collapsible steering column system;

DETAILED DESCRIPTION OF THE PREFERRED EMBODIMENTS

The following description of the preferred embodiment(s) is merely exemplary in nature and is in no way intended to limit the invention, its application, or uses.

Figure 1:
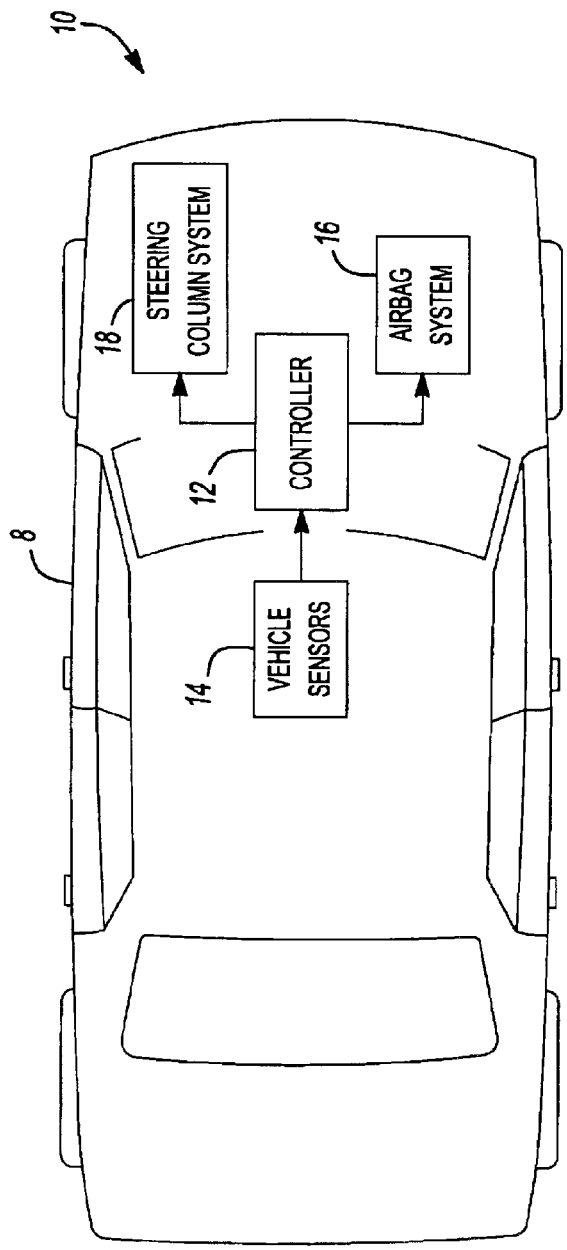
FIG. 1 is a schematic view of an impact absorption system constructed according to the principles of the present invention.

With reference to FIG. 1 of the drawings, an exemplary motor vehicle 8 is illustrated to include an impact absorption system 10 that is constructed in accordance with the teachings of the present invention. The impact absorption system 10 is mounted within the motor vehicle 8 and includes a controller 12 in communication with a plurality of sensors 14, an airbag deployment system 16, and a collapsible steering column system 18.

The controller 12 is preferably an electronic microprocessor unit. The controller 12 communicates electronically with the other components of the impact absorption system 10, receiving data from the plurality of sensors 14 and issuing commands to the airbag system 16 and to the steering column system 18, as will be described in greater detail below.

The plurality of sensors 14 are mounted throughout the motor vehicle 8 and are designed to monitor and report to the controller 12 the current condition of the motor vehicle 8 and any occupants therein. Specifically, the sensors 14 include an occupant weight sensor, an occupant height sensor, an occupant's distance to wheel sensor, a seat position sensor, a seat belt sensor, a vehicle speed sensor, and an impact sensor. However, various other vehicle sensors may be employed. The sensors 14 communicate to the controller 12 either continuously (e.g. the seat belt sensor) or at an activating event (e.g. the impact sensor). The controller 12 processes these communications from the sensors 14 and uses them to determine a baseline level of impact absorption for the impact absorption system 10, as will be described in greater detail below.

Figure 2:
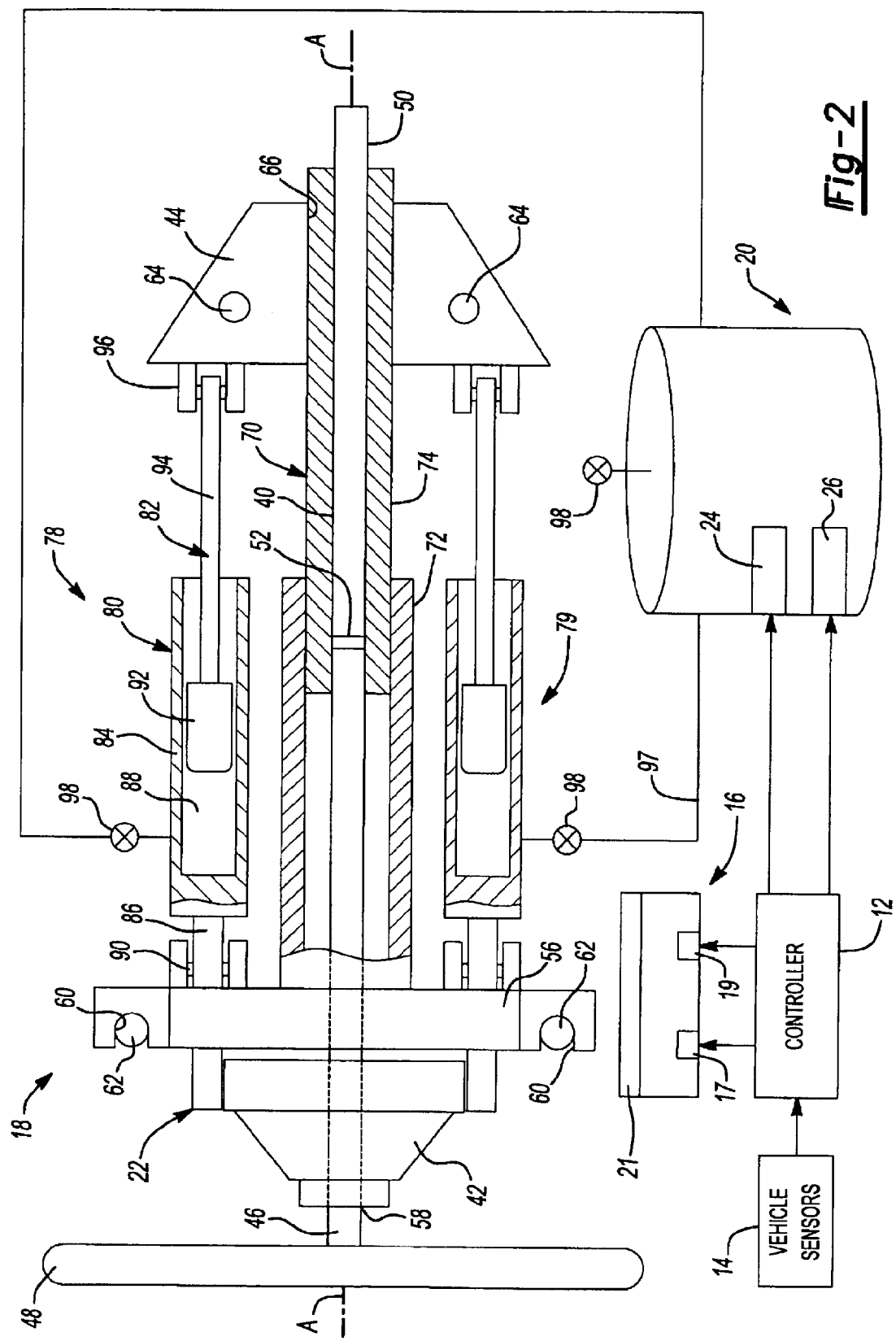
FIG. 2 is a sectional view of a collapsible steering column system constructed in accordance with the principles of the present invention.

With reference to FIG. 2, the airbag system 16 generally includes a first airbag igniter 17, a second airbag igniter 19, and an airbag 21. The first and second airbag igniters 17, 19 are in communication with the controller 12. When activated by the controller 12, the igniters 17, 19 release a pressurized fluid into the volume of the airbag 21, thereby deploying the airbag 21 within the motor vehicle 8 to protect the occupant of the motor vehicle 8 during an impact event. The igniters 17, 19 may be activated either singly (e.g. activating only the first airbag igniter 17 or second airbag igniter 19) or together (e.g. firing either the first and second airbag igniters 17, 19 sequentially or at the same time). Activating only one of the igniters 17, 19 provides less pressure within the airbag 21 volume than activating both igniters 17, 19 together, and consequently provides the airbag 21 with less deployment force. Additionally, greater numbers of igniters may be employed to develop further stages of airbag deployment.

With continued reference to FIG. 2, the steering column system 18 includes an expansion tank 20 coupled to a steering column 22. The expansion tank 20 has a fixed volume (e.g. a control volume) and includes a first stage igniter 24 and a second stage igniter 26. The igniters 24, 26 are in communication with the controller 12. When activated by the controller 12, the igniters 24, 26 release a pressurized fluid into the volume of the expansion tank 20. The igniters 24, 26 may be activated either singly (e.g. activating only the first stage igniter 24 or the second stage igniter 26) or together (e.g. firing either the first and second stage igniters 24, 26 sequentially or at the same time). Activating only one of the igniters 24, 26 provides less pressure within the expansion tank 20 volume than activating both igniters 24, 26 together. Additionally, any number of igniters may be employed to develop any desired pressure within the steering column system 18, thus allowing the steering column system 18 to be tunable to any potential driver, as will be explained below.

The steering column 22 is mounted within the motor vehicle 8 and extends from the cab (not shown) into the steering assembly (not shown). The steering column 22 includes a steering shaft 40 mounted between an upper mounting bracket 42 and a lower mounting bracket 44. The steering shaft 40 defines a longitudinal axis indicated by the line A—A in the drawings. The steering shaft 40 includes an upper end 46 extending through the upper mounting bracket 42. A steering wheel 48 is mounted to the upper end 46. A lower end 50 of the steering shaft 40 extends through the lower mounting bracket 44 and is coupled to the steering assembly (not shown) of the motor vehicle 8. A sliding feature 52 is formed along the length of the steering shaft 40. The sliding feature 52 is designed to collapse the steering shaft 40 during an impact event under a predetermined minimum force directed along the longitudinal axis A—A of the steering shaft 40.

The upper mounting bracket 42 includes a base 56 fixed to the motor vehicle 8. A bore 58 is formed through the upper mounting bracket 42 and the base 56. The bore 58 is sized to receive the steering shaft 40. In the particular example provided, the base 56 includes a pair of release capsules 60 sized to receive a pair of bolts 62 therethrough. The bolts 62 fix the upper mounting bracket 42 to the motor vehicle 8. However, the release capsules 60 allow the bolts 62 to slip free from the upper mounting bracket 42 along axis A—A in the direction of the lower mounting bracket 44. It is to be appreciated that various other methods of fixing the upper mounting bracket 42 to the motor vehicle 8 may be employed.

The lower mounting bracket 44 is fixed to the motor vehicle 8 by bolts 64 and is not permitted to move relative to the motor vehicle 8. Alternate methods of fixing the lower mounting bracket 44 to the motor vehicle 8 may also be employed, for example screws or welds. A lower bore 66 extends through the lower mounting bracket 44 and is sized to receive a portion of a sliding sleeve assembly, as will be described below.

A sliding sleeve assembly 70 extends along axis A—A and surrounds a portion of the steering shaft 40. The sliding sleeve assembly 70 includes a large sleeve 72 sized to receive a small sleeve 74. The large sleeve 72 has a hollow cylindrical shape. The large sleeve 72 is fixed at one end to the upper mounting bracket 42 and extends towards the lower mounting bracket 44 along axis A—A. The small sleeve 74 has a hollow cylindrical shape with a diameter less than the diameter of the large sleeve 72. The small sleeve 74 is mounted within the lower bore 66 at one end and fixed to the lower mounting bracket 44. The small sleeve 74 extends out from the lower mounting bracket 44 along axis A—A towards the upper mounting bracket 42 and is received within the large sleeve 72. As will be described in greater detail below, the small sleeve 74 is slideable within the large sleeve 72 when the lower mounting bracket 44 moves relative to the upper mounting bracket 42. The steering shaft 40 extends through the large sleeve 72 and through the small sleeve 74.

The steering column 22 further includes a pair of piston cylinders 78, 79 mounted between the upper mounting bracket 42 and the lower mounting bracket 44. As both piston cylinders 78, 79 are identical, only piston cylinder 78 will be described in further detail.

The piston cylinder 78 includes a cylinder 80 sized to receive a piston 82. The cylinder 80 includes a cylinder housing 84 and a rod 86 that extends from a single side of the cylinder housing 84. The cylinder housing 84 defines a piston bore 88. The rod 86 is coupled to a pivot joint 90 mounted to the upper mounting bracket 42. The pivot joint 90 allows the cylinder 80 to pivot with respect to the upper mounting bracket 42.

The piston 82 includes a piston head 92 with a piston rod 94 that extends out from a single side of the piston head 92. The piston head 92 extends into the piston bore 88 and is sealed to the cylinder housing 84 such that the piston head 92 may slide within the cylinder housing 84 without breaking the seal. The piston rod 94 is coupled to a pivot joint 96 mounted to the lower mounting bracket 44. The pivot joint 96 allows the piston 82 to pivot with respect to the lower mounting bracket 44.

Turning briefly to FIG. 3, an alternative sliding sleeve assembly 70' is illustrated as having an internal piston cylinder arrangement in place of the piston cylinders 78, 79 as shown in FIG. 2. Specifically, the sliding sleeve assembly 70' includes a large sleeve cylinder 72' and a small sleeve piston 74'. The large sleeve cylinder 72' acts as a cylinder housing for receiving the small sleeve piston 74' therein. To this end, the large sleeve cylinder 72' includes a piston bore 88' formed therein sized to receive the small sleeve piston 74'. The small sleeve piston 74' is sealed to the large sleeve cylinder 72'. The small sleeve piston 74' may slide within the piston bore 88' towards the upper mounting bracket 42 without breaking this seal. The steering shaft 40 extends through the large sleeve cylinder 72' and the small sleeve piston 74'.

Returning again to FIG. 2, the expansion tank 20 is coupled to the steering column 22 through lines 97 that extend from the expansion tank 20 to each of the piston cylinders 78, 79 (or alternatively the sliding sleeve assembly 70' as shown in FIG. 3). The lines 97 extend into the piston bore 88 and transmit pressurized fluid from the expansion tank 20 to the steering column 22. Each line 97 and the expansion tank 20 include a release valve 98. Release valves 98 vent the contents of the piston bore 88, the lines 97, and the expansion tank 20 after a certain pressure within the steering column system 18 has been reached. A more detailed description of this operation will be provided below.

Figure 4:
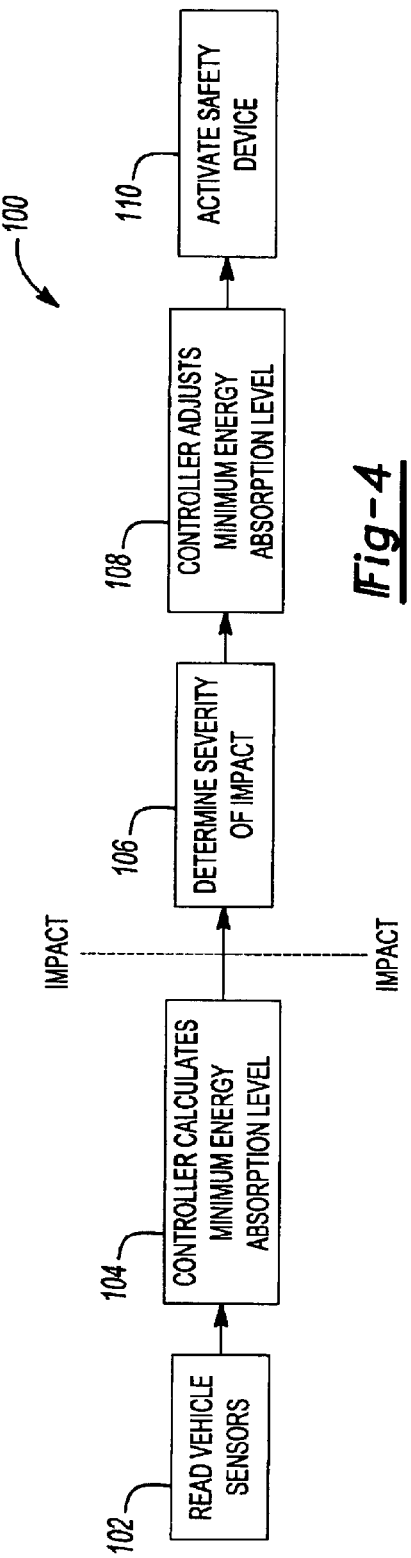
FIG. 4 is a diagram depicting a method for managing the impact absorption system according to the principles of the present invention.

Turning now to FIG. 4, and with continued reference to FIGS. 1–3, a method of managing the impact absorption system 10, indicated generally by reference numeral 100, will now be described in detail. The method 100 begins when the controller 12 reads the plurality of vehicle sensors 14 shown at step 102. As noted above, these sensors 14 include those that are relevant to defining the conditions of the motor vehicle 8 and the conditions of the occupants contained therein.

Next, the controller 12 calculates a baseline (minimum) energy absorption level for the impact absorption system 10, shown at step 104. The baseline energy absorption level is defined as the minimum amount of energy the impact absorption system 10 should absorb during an impact event given the conditions of the occupant and of the motor vehicle 8 as indicated by the sensors 14. For example, a larger, heavier occupant requires a greater amount of energy absorption than a smaller, lighter occupant. The controller 12 will assign a combination of igniters 17, 19 from the airbag system 16 and a combination of igniters 24, 26 from the steering column system 18 to activate in the event of an impact event to absorb this baseline energy.

After an impact event (e.g., a collision involving the motor vehicle 8), the controller 12, through an impact sensor within the plurality of sensors 14, determines the severity of the impact, shown at step 106. Whether an impact is considered "severe" or "moderate" or "light", or any one of a number of other designations, is based on the impact force itself as read through the impact sensor. It is to be appreciated that various other factors may be employed to determine the severity of the impact, including the speed of the motor vehicle 8 and the model of the motor vehicle 8.

The controller 12 next adjusts the baseline energy absorption level according to the severity of the impact, shown at step 108. The controller 12 may increase the baseline energy absorption level by assigning a greater number of igniters 17, 19, 24, 26 to activate, or alternatively may keep the assigned baseline energy absorption level if the energy of the impact event is less than the baseline energy absorption level.

The controller 12 activates the safety devices of the motor vehicle (e.g. the airbag system 16 and/or the steering column system 18) at step 110. With regards to the airbag system 16, as best seen in FIG. 2, one or both of the igniters 17, 19 are fired to pressurize the airbag 21, thus deploying it inside the motor vehicle 8. The airbag 21 absorbs a certain amount of collision energy, depending on the pressure within the airbag 21. Alternatively neither igniter 17, 19 may be activated.

With regards to the steering column system 18, as best seen in FIGS. 2 and 3, one or both of the igniters 24, 26 are fired to pressurize the expansion tank 20, which in turn pressurizes the piston cylinders 78, 79 (FIG. 2) or the sliding sleeve assembly 70' (FIG. 3). As the steering shaft 40 collapses at the sliding feature 52, the upper mounting bracket 42 moves towards the lower mounting bracket 44, in turn urging the small sleeve 70 to slide within the large sleeve 72. Simultaneously, the pistons 82 stroke within the cylinders 80 and compress the pressurized fluid in the cylinder housings 88. Once a certain level of pressurization has been reached, release valves 98 open and the pressure is released. This converts the potential energy of the piston cylinders 78 and the expansion tank 20 into the kinetic energy of the escaping pressurized fluid, thereby absorbing a certain amount of energy from the impact event.

The total amount of energy that is absorbed by the impact absorption system 10 is therefore tunable by selecting which of the igniters 17, 19, 24, 26 is activated during the impact event. Further tuning of the impact absorption system may be accomplished by adding further igniters to the airbag system 16 or the steering column system 18, or by modifying the pressure limits and pressure release rates of the release valves 98.

Figure 5:
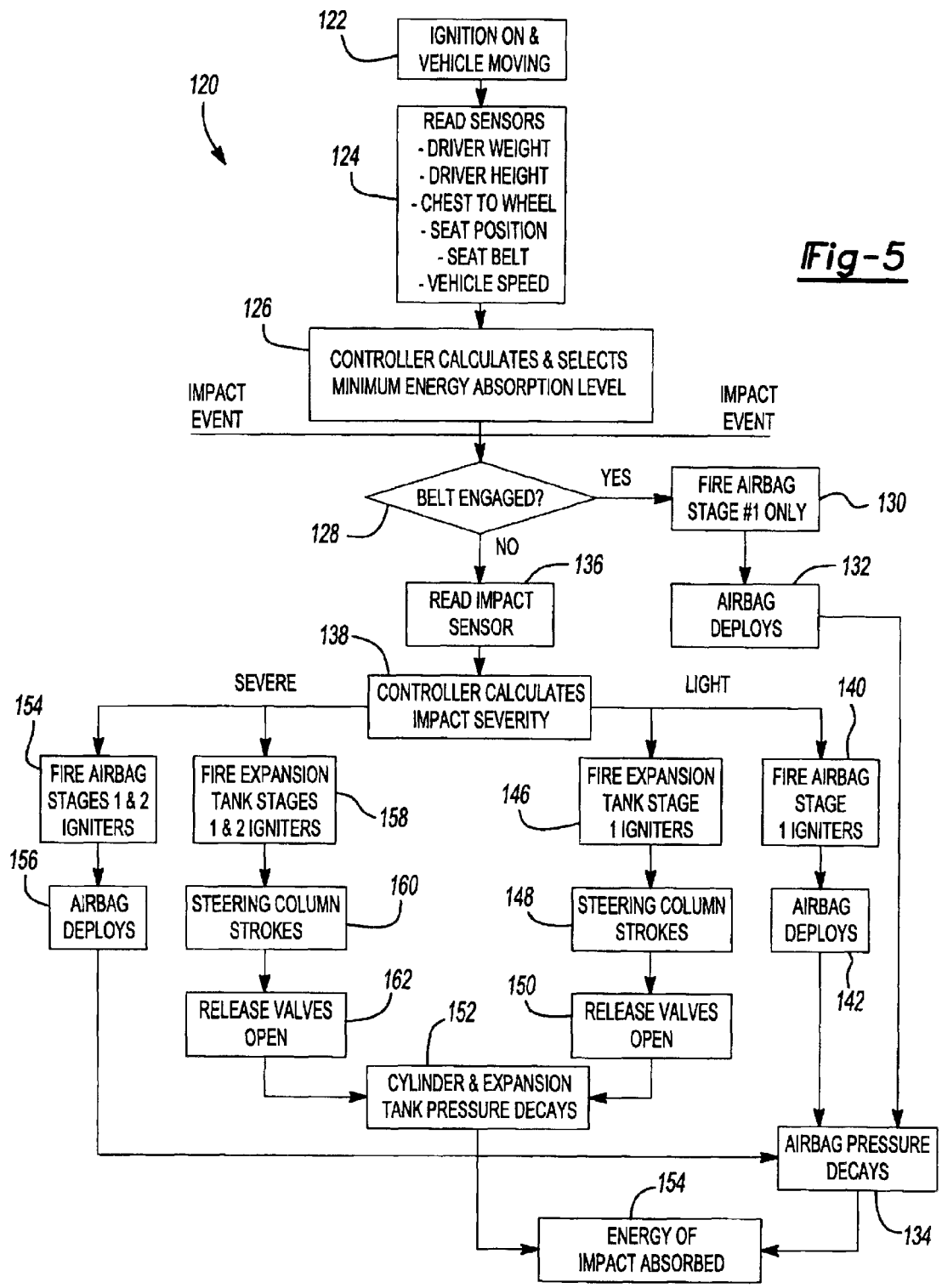
FIG. 5 is a flow chart illustrating an exemplary embodiment of the method for managing the impact absorption system.

With reference to FIG. 5, a more detailed description of an exemplary method, indicated generally by reference numeral 120, for managing the impact energy in the impact absorption system 10 will now be provided. The absorption method 120 begins when the motor vehicle 8 is started and moving, shown at step 122. The controller 12 then reads the plurality of sensors 14 shown at step 124. Specifically, for example, the controller 12 reads the driver weight sensor, the driver height sensor, the chest to wheel sensor, the seat position sensor, the seat belt sensor, and the vehicle speed sensor. The controller 12 determines the baseline energy absorption level, shown at step 126, based on the data from the plurality of sensors 14.

After an impact event has occurred, the controller 12 determines from the plurality of sensors 14 whether the seat belt of the driver is engaged, shown at step 128. If the seat belt is engaged, the controller fires the first airbag igniter 17 at step 130. This deploys the airbag 21 at step 132. As the driver of the motor vehicle 8 impacts the airbag 21, the air bag pressure will decay, shown at step 134, thereby absorbing the energy of the impact event.

If the controller 12 determines from the plurality of sensors 14 that the seat belt was not engaged, the controller 12 goes on to read the impact sensor from the plurality of sensors 14 at step 136. The controller 12 then calculates the impact severity of the impact event, classifying it as either "severe" or "light" as shown in step 138.

If the impact event is classified as "light", the controller 12 fires the first airbag igniter 17 at step 140. The airbag 21 deploys at step 142. The airbag 21 pressure then decays at step 134, absorbing the energy of the impact in the process.

Simultaneously, the controller 12 fires the first stage igniter 24 of the steering column system 18, shown at step 146, thereby pressurizing the piston cylinders 78. The steering column 22 strokes at step 148, increasing the pressure within the piston cylinders 78. Then the release valves 98 open under the increased pressure at step 150, bleeding the pressure from the steering column system 18 at step 152 and absorbing the energy of the impact event.

If the impact event is classified as "severe", the controller 12 fires the first airbag igniter 17 and the second airbag igniter 19 simultaneously at step 154. The airbag 21 deploys at step 156. The airbag 21 pressure then decays at step 134, absorbing the energy of the impact in the process.

Simultaneously, the controller 12 fires the first stage igniter 24 and the second stage igniter 26 of the steering column system 18, shown at step 158, thereby pressurizing the piston cylinders 78. The steering column 22 strokes at step 160, increasing the pressure within the piston cylinders 78. Then the release valves 98 open under the increased pressure at step 162, bleeding the pressure from the steering column system 18 at step 152 and absorbing the energy of the impact event.

As mentioned above, the bleeding of the pressure from the airbag system 16 and from the steering column system 18 at steps 144 and 152, respectively, effectively absorbs the energy of the impact event tailored to the specific conditions of the occupants of the motor vehicle 8.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tunable impact absorption system for a motor vehicle comprising:
  a steering column having a first sleeve and a second sleeve, the first sleeve sized to receive a portion of the second sleeve, the sleeves extending between a first mounting bracket and a second mounting bracket, and a piston cylinder assembly mounted between the first and second mounting brackets;

a plurality of igniters in communication with the piston cylinder assembly, the plurality of igniters capable of releasing a pressurized fluid when activated to pressurize the piston cylinder assembly;

a plurality of sensors mounted within the motor vehicle for signaling vehicle and driver conditions; and a controller in communication with the plurality of sensors and the plurality of igniters, the controller activating at least one of the plurality of igniters based on signals received from the plurality of sensors during an impact event.

2. The tunable impact absorption system of claim 1 further comprising a collapsible steering shaft adapted to steer the motor vehicle and disposed within the first and second sleeves.

3. The tunable impact absorption system of claim 1, wherein the piston cylinder assembly is mounted within the first sleeve and the second sleeve.

4. The tunable impact absorption system of claim 1, further comprising a control volume for housing the plurality of igniters, the control volume in communication with the piston cylinder assembly.

5. The tunable impact absorption system of claim 1, further comprising an airbag deployment system having a plurality of igniters capable of releasing a pressurized fluid when activated to pressurize the airbag deployment system, the plurality of igniters activated by the controller during an impact event.

6. The tunable impact absorption system of claim 4, further comprising a pneumatic line extending between the control volume and the piston cylinder assembly for providing fluid communication between the control volume and the piston cylinder assembly.

7. The tunable impact absorption system of claim 6, further comprising a pressure release valve mounted between the control volume and the steering column along the pneumatic line.

8. The tunable impact absorption system of claim 1, wherein the plurality of sensors include a driver height sensor, a driver weight sensor, a chest to wheel sensor, a seat position sensor, a seat belt sensor, a vehicle speed sensor, and an impact sensor.

* * * * *